US011412753B2

(12) United States Patent
Seo et al.

(10) Patent No.: US 11,412,753 B2
(45) Date of Patent: Aug. 16, 2022

(54) GRANULAR COMPOSITION COMPRISING DIETARY FIBERS DERIVED FROM GREEN TEA AND METHOD FOR PREPARING THE SAME

(71) Applicant: Amorepacific Corporation, Seoul (KR)

(72) Inventors: Juyeon Seo, Yongin-si (KR); Jinoh Chung, Yongin-si (KR)

(73) Assignee: Amorepacific Corporation, Seoul (KR)

( * ) Notice: Subject to any disclaimer, the term of this patent is extended or adjusted under 35 U.S.C. 154(b) by 237 days.

(21) Appl. No.: 16/665,770

(22) Filed: Oct. 28, 2019

(65) Prior Publication Data

US 2020/0128842 A1 Apr. 30, 2020

(30) Foreign Application Priority Data

Oct. 31, 2018 (KR) .................. 10-2018-0132238

(51) Int. Cl.

| A23F 3/14 | (2006.01) |
| A23F 3/22 | (2006.01) |
| A23F 3/32 | (2006.01) |
| A23L 29/30 | (2016.01) |
| A23L 33/00 | (2016.01) |
| A23L 33/26 | (2016.01) |
| A23F 3/42 | (2006.01) |

(52) U.S. Cl.
CPC .................. *A23F 3/14* (2013.01); *A23F 3/22* (2013.01); *A23F 3/32* (2013.01); *A23F 3/423* (2013.01); *A23L 29/37* (2016.08); *A23L 33/26* (2016.08); *A23L 33/30* (2016.08)

(58) Field of Classification Search
CPC ...... A23F 3/14; A23F 3/22; A23F 3/32; A23F 3/423; A23L 33/26; A23L 33/30; A23L 29/37
See application file for complete search history.

(56) References Cited

U.S. PATENT DOCUMENTS

| 2007/0207187 A1 | 9/2007 | Yajima et al. |
| 2008/0057175 A1 | 3/2008 | Barnekow et al. |
| 2009/0081350 A1* | 3/2009 | Abe ................... A23F 3/166 426/597 |
| 2009/0104337 A1* | 4/2009 | Abe ................... A23F 3/20 426/597 |
| 2013/0189333 A1 | 7/2013 | Gao et al. |
| 2015/0098909 A1 | 4/2015 | Gao et al. |
| 2015/0150804 A1 | 6/2015 | Obae et al. |
| 2020/0128844 A1 | 4/2020 | Seo et al. |

FOREIGN PATENT DOCUMENTS

| CN | 103099213 A | 5/2013 |
| CN | 105394758 A | 3/2016 |
| CN | 107593997 A | 1/2018 |
| CN | 108606330 A | 10/2018 |
| JP | 2002-010737 A | 1/2002 |
| JP | 2006-204149 A | 8/2006 |
| JP | 2010-068741 A | 4/2010 |
| JP | 2010-285381 A | 12/2010 |
| JP | 2014-068635 A | 4/2014 |
| JP | 2018-16818 A | 2/2018 |
| KR | 10-2006-0090894 A | 8/2006 |
| KR | 10-2006-0133050 A | 12/2006 |
| KR | 10-2008-0011545 A | 2/2008 |
| KR | 10-2009-0050282 A | 5/2009 |
| KR | 10-2009-0122031 A | 11/2009 |
| KR | 10-2011-0060465 A | 6/2011 |
| KR | 10-1233648 B1 | 2/2013 |
| KR | 10-1289042 B1 | 7/2013 |
| KR | 10-2018-0016818 A | 2/2018 |
| WO | 2006/010654 A1 | 2/2006 |

OTHER PUBLICATIONS

Analysis of Health Tea. 2000. https://www.ktr.co.jp/english/zairyou/z1_syo02.html.*
Translation for CN103099213 published May 2013.*
Translation for JP2002010737 published Jan. 2002.*
Translation for KR20090050282 published May 2009.*
Translation for CN108606330 published Oct. 2, 2018.*
Yamamoto et al., "Chemistry and Applications of Green Tea", CRC Press 1997, pp. 13, 14 and 20.
"Mesh (scale)", 2020, https://en/wikipedia.org/wiki/Mesh_(scale) (5 pages total).

* cited by examiner

*Primary Examiner* — Anthony J Weier

(74) *Attorney, Agent, or Firm* — Sughrue Mion, PLLC

(57) ABSTRACT

A granular composition containing dietary fibers derived from green tea and a method for preparing the same are provided. The granular composition may be prepared into granules, which has a suitable size and a shape to eat, using dietary fiber-containing processed green tea, an oligosaccharide and a sugar alcohol as raw materials. The granular composition may also be useful in solving the problems such as dust scattering, choking, and the like due to the good flowability of the granules, and manufacturing goods because the granular composition is easy to quantify due to the good filling properties.

13 Claims, No Drawings

GRANULAR COMPOSITION COMPRISING DIETARY FIBERS DERIVED FROM GREEN TEA AND METHOD FOR PREPARING THE SAME

CROSS-REFERENCE TO RELATED APPLICATION

This application claims priority to and the benefit of Korean Patent Application No. 2018-0132238, filed Oct. 31, 2018, the disclosure of which is incorporated herein by reference in its entirety.

BACKGROUND

1. Field

The disclosure relates to a granular composition comprising dietary fibers derived from green tea and a method for preparing the same.

2. Discussion of Related Art

Oligosaccharides and dietary fibers are components rich in foods, for example, vegetables, fruits, algae, and the like, and are high-molecular carbohydrates that are excreted from the human body without being digested by human digestive enzymes. Owing to such characteristics of the dietary fibers, the dietary fibers are recently known to have excellent functions as prebiotics that affect the enterobacteria to inhibit the growth of pathogens and promote the growth of beneficial bacteria. In addition, when one eats a sufficient amount of the dietary fibers, the dietary fibers give a feeling of fullness while inhibiting digestion and absorption of other nutrients. Therefore, the dietary fibers are known to have a number of very beneficial functions to the human body by controlling overeating, preventing or relieving constipation, and excreting toxic substances such as cholesterol and heavy metals.

However, when the oligosaccharides and the dietary fibers are ingested in the form of powder, they have poor preference and convenience for eating, for examples, staleness, food jamming between teeth, dust scattering, and the like due to the characteristics of tough and coarse particles. Also, the powders which are not in the form of particles have a drawback in that it is difficult to package and fill products due to poor flowability.

Accordingly, a new form of dietary product containing oligosaccharides and the dietary fibers, which has excellent preference as well as the convenience for eating and holding, using a raw material that may be prepared into shapes easy to intake high-content dietary fibers, is desired.

RELATED DOCUMENTS

Patent Documents

Patent Document 1: Korean Patent Publication No. 2006-0133050
Patent Document 2: Korean Patent Publication No. 2018-0016818

SUMMARY OF THE INVENTION

A granular composition using an oligosaccharide and xylitol as raw materials as well as processed green tea containing dietary fibers is disclosed. The granular composition has little scattered dust due to good flowability, is not stuck to teeth during the food intake, has an improved choking phenomenon, and is favorable for manufacturing goods due to the good filling properties.

Therefore, an object of an embodiment is to provide a granular composition comprising dietary fibers derived from green tea, which has good flowability, and a method for preparing the same.

To achieve the objects, according to one aspect of the present invention, there is provided a granular composition including processed green tea having a dietary fiber content of 70% by weight or more; an oligosaccharide; and a sugar alcohol. The term "processed green tea" as used herein means a product having a dietary fiber content of 70% by weight or more, obtained by extracting, separating and purifying using green tea as a raw material. The dietary fiber may be a insoluble dietary fiber.

The content of dietary fibers included in the processed green tea may be greater than or equal to 90% by weight.

The granular composition may include 30 to 60% by weight of the processed green tea; 5 to 30% by weight of the oligosaccharide; and 30 to 50% by weight of the sugar alcohol.

The oligosaccharide may include one or more selected from the group consisting of fructooligosaccharides, maltooligosaccharides, isomaltooligosaccharides, galactooligosaccharides, and soy oligosaccharides.

The sugar alcohol may include one or more selected from the group consisting of xylitol, erythritol, isomalt, maltitol, sorbitol, mannitol, lactitol, and manatol.

The granular composition may have a particle size of 0.5 to 2 mm.

Another object of the present invention is to provide a method for preparing a granular composition, which includes: (a) sequentially extracting green tea with spirits and purified water to prepare processed green tea having a dietary fiber content of 70% by weight or more; and (b) mixing the processed green tea, an oligosaccharide and a sugar alcohol and then extrusion-molding the resulting mixture.

In the method for preparing a granular composition, the step (a) includes the following steps (a1) to (a5):

(a1) primarily extracting the green tea with spirits and secondarily extracting the green tea with purified water;

(a2) extracting the green tea residue remaining after the primary and secondary extraction in the step (a1) with alkali;

(a3) subjecting the alkali extract obtained in the step (a2) to solid-liquid separation to remove an alkali extract solution and adding an acid to the remaining solid alkali extract to neutralize the solid alkali extract; and (a4) subjecting the acid extract neutralized in the step (a3) to solid-liquid separation to remove an acid extract solution and washing the remaining solid acid extract; and (a5) drying and pulverizing the solid extract obtained after the step (a4) to prepare processed green tea.

In the method for preparing a granular composition, the step (b) includes the following steps (b1) to (b3):

(b1) pulverizing the processed green tea, the oligosaccharide and the sugar alcohol to form a powder raw material having a size of 80 meshes or less;

(b2) adding a binding solution to the powder raw material so that the binding solution is mixed with the powder raw material; and (b3) subjecting the mixture obtained in the step (b2) to extrusion molding to form granules.

The binding solution may include one or more selected from the group consisting of purified water, spirits, and hydrocolloids.

DETAILED DESCRIPTION OF EXEMPLARY EMBODIMENTS

Hereinafter, the present invention will be described in detail.

Hereinafter, the present invention will be described in further detail so that a person having ordinary skill in the art to which the present invention belongs can easily put the invention into practice. However, it should be understood that the present invention may be embodied in various forms and is not limited to the Examples described herein.

Granular Composition Including Dietary Fibers Derived from Green Tea

An embodiment of the present invention relates to a granular composition comprising dietary fibers derived from green tea, and more particularly, to a granular composition including processed green tea having a dietary fiber content of 70% by weight or more; an oligosaccharide; and a sugar alcohol. The dietary fibers included in the processed green tea may be insoluble dietary fibers.

In the embodiment, the processed green tea is green tea in which a content of dietary fibers increases by removing catechin, water-soluble dietary fibers, proteins, caffeine, and other impurities, all of which are included in the green tea, by means of an extraction process using the green tea as a raw material. In this case, the dietary fibers may be insoluble dietary fiber.

The content of the dietary fibers included in the processed green tea may be greater than or equal to 70% by weight, and preferably 90% by weight. When the content of the dietary fibers is less than this content range, it is difficult to form granules having a high content of the dietary fibers in the granular composition, and the green tea may give an unpleasant taste due to its innate bitter and astringent tastes. Also, the content of the insoluble dietary fibers included in the processed green tea may be less than or equal to 95% by weight in consideration of the content of moisture.

Also, the processed green tea may be included at a content of 30 to 60% by weight, preferably 35 to 55% by weight, and more preferably 40 to 50% by weight, based on the total weight of the granular composition. When the content of the processed green tea is less than this content range, the content of the insoluble dietary fibers may be reduced with respect to the total weight of the granular composition, which makes it possible to deteriorate positive functional effects of the dietary fibers upon the intake. Also, when the content of the processed green tea is greater than the above range, a composition having a granular shape may not be easily formed.

In an embodiment of the present invention, the oligosaccharide may be a raw material that is mixed with the processed green tea to promote formation of the composition having a granular shape. Also, the oligosaccharide may become food for the lactobacilli, thereby exerting an effect of preventing or ameliorating large intestine-related diseases.

The oligosaccharide may include one or more selected from the group consisting of fructooligosaccharides, maltooligosaccharides, isomaltooligosaccharides, galactooligosaccharides, and soy oligosaccharides. Preferably, the oligosaccharide may be a fructooligosaccharide.

Also, the oligosaccharide may be included at a content of 5 to 30% by weight, preferably 10 to 25% by weight, and more preferably 10 to 20% by weight, based on the total weight of the granular composition. When the content of the oligosaccharide is less than this content range, the oligosaccharide may not provide satisfactory effects of improving the tastes. On the other hand, when the content of the oligosaccharide is greater than this content range, the tastes improving effects may be reduced due to an excessively strong sweet taste.

In an embodiment of the present invention, the sugar alcohol may be mixed with the processed green tea and the oligosaccharide as described above to become a raw material of the composition having a granular shape, and may enhance a sweet taste to improve the tastes.

The sugar alcohol may include one or more selected from the group consisting of xylitol, erythritol, isomalt, maltitol, sorbitol, mannitol, lactitol, and manatol. Preferably, the sugar alcohol may be xylitol, erythritol, and a mixture thereof.

Also, the sugar alcohol may be included at a content of 30 to 50% by weight, preferably 33 to 44% by weight, and more preferably 35 to 44% by weight, based on the total weight of the granular composition. When the content of the sugar alcohol is less than this content range, it could be difficult to form granules. On the other hand, when the content of the sugar alcohol is greater than the above range, a health beneficial effect of the dietary fibers may be degraded due to a decrease in content of the dietary fibers in the granular composition.

In an embodiment of the present invention, the granular composition may have a particle size of 0.5 to 2 mm, preferably 0.8 to 1.8 mm, and more preferably 1 to 1.5 mm. When the particle size of the granular composition is less than this size range, dust scattering may occur. On the other hand, when the particle size of the granular composition is greater than this size range, the particle size may increase, thereby causing a residual feeling in the mouth, food jamming between teeth, and the like.

In an embodiment of the present invention, a natural carbohydrate and/or a sweetening agent may be used as an additive(s) that may be further included in the granular composition.

Examples of the aforementioned natural carbohydrate include monosaccharides, for example, glucose, fructose, and the like; disaccharides, for example maltose, sucrose, and the like; and polysaccharides, for example, conventional sugars such as dextrin, cyclodextrin, and the like, and sugar alcohols such as xylitol, sorbitol, erythritol, and the like. Natural sweetening agents (thaumatin, a stevia extract (for example, rebaudioside A, glycyrrhizin, and the like)), and synthetic sweetening agents (saccharin, aspartame, and the like) may be favorably used as the sweetening agent.

In addition, the granular composition of an embodiment of the present invention may contain various nutrients, vitamins, minerals (electrolytes), a flavoring agent(such as synthetic and natural flavoring agents), a coloring agent and a filler (cheese, chocolate, and the like), pectic acid and salts thereof, alginic acid and salts thereof, organic acid, a protective colloidal thickening agent, a pH control agent, a stabilizing agent, a preservative, glycerin, an alcohol, a carbonizing agent used for carbonated drinks, and the like.

Specific examples of the carrier, the excipient, the diluent and the additive are not limited, but one or more selected from the group consisting of lactose, dextrose, sucrose, sorbitol, mannitol, erythritol, starch, acacia gum, calcium phosphate, alginate, gelatin, calcium phosphate, calcium silicate, microcrystalline cellulose, polyvinyl pyrrolidone, cellulose, polyvinyl pyrrolidone, methyl cellulose, water, sugar syrup, methyl cellulose, methyl hydroxybenzoate, propyl hydroxybenzoate, talc, magnesium stearate, and mineral oil are preferably used.

Method for Preparing Granular Composition Including Dietary Fibers Derived from Green Tea Also, an embodiment of the present invention relates to a method for preparing a granular composition including dietary fibers derived from green tea. Here, the method for preparing a granular composition may include (a) sequentially extracting green tea with spirits and purified water to prepare processed green tea having a dietary fiber content of 70% by weight or more; and (b) mixing the processed green tea with a sugar alcohol and then extrusion molding the resulting mixture.

Hereinafter, an embodiment of the present invention will be described in further detail with reference to the respective steps.

In an embodiment of the present invention, the step (a) includes preparing processed green tea having a dietary fiber content of 70% by weight or more, and specifically includes a process further divided into the following steps (a1) to (a5):

(a1) primarily extracting green tea with spirits and secondarily extracting the remaining residue with purified water;

(a2) extracting the green tea residue remaining after the primary and secondary extraction in the step (a1) with alkali;

(a3) subjecting the alkali extract obtained in the step (a2) to solid-liquid separation to remove an alkali extract solution and adding an acid to the remaining solid alkali extract to neutralize the solid alkali extract; and (a4) subjecting the acid extract neutralized in the step (a3) to solid-liquid separation to remove an acid extract solution and washing the remaining solid acid extract; and (a5) drying and pulverizing the solid extract obtained after the step (a4) to prepare processed green tea.

In the step (a1), after the green tea is primarily extracted with spirits, the remaining residue may be secondarily extracted with purified water.

The primary extraction may be a process of removing catechin from the green tea. In this case, the green tea may be green tea leaves, and the spirits may be 70% spirits.

Also, the primary extraction may be performed at a temperature of 60 to 80° C. for 0.5 to 2 hours, and preferably performed at a temperature of 65 to 75° C. for 0.5 to 1.5 hours. Upon the primary extraction, the temperature and time are the optimal temperature and time at which only catechin may be removed from the green tea. When the temperature and time are less than these ranges, a desired level of catechin may not be removed. On the other hand, when the temperature and time are greater than these ranges, the active ingredients included in the green tea may be denatured. Also, the catechin may be removed together with chlorophyll, caffeine, and other impurities.

The secondary extraction may be a process of removing water-soluble substances from the primarily extracted green tea. In this case, the water-soluble substances may refer to water-soluble dietary fibers and sugars.

Also, the secondary extraction may be performed at 80 to 100° C. for 2 to 4 hours, and preferably at 85 to 95° C. for 2.5 to 3.5 hours. Upon the secondary extraction, the temperature and time are the optimal temperature and time at which only the water-soluble substances may be removed from the primarily extracted green tea. When the temperature and time are less than these ranges, a desired level of the water-soluble substances may not be removed. On the other hand, when the temperature and time are greater than these ranges, the active ingredients included in the green tea may be denatured.

As such, after the green tea is subjected to the primary and secondary extraction, the green tea residue obtained by sequentially removing catechin and the water-soluble substances from the green tea may be obtained.

In the step (a2), the green tea residue remaining after the primary and secondary extraction in the step (a1) may be extracted by immersing the green tea residue in an alkaline solution.

In this case, the alkali used during the extraction with the alkali may include one or more selected from the group consisting of sodium hydroxide, potassium hydroxide, magnesium hydroxide, magnesium oxide, calcium oxide, and sodium bicarbonate. Preferably, the alkali may be a 0.5 to 5% alkali aqueous solution in consideration of the efficiency of selective removal of the proteins included in the green tea residue.

Also, the extraction with the alkali may be performed at a temperature of 80 to 100° C. for 1 to 3 hours, preferably at a temperature of 85 to 95° C. for 1.5 to 2.5 hours. Upon the extraction with the alkali, the temperature and time are the optimal temperature and time at which only the proteins may be selectively removed from the green tea residue. When the temperature and time are less than these ranges, a desired level of the proteins may not be removed. On the other hand, when the temperature and time are greater than these ranges, the active ingredients included in the green tea may be denatured.

In the step (a3), the alkali extract obtained in the step (a2) may be subjected to solid-liquid separation to remove an alkali extract solution, and an acid may be then added to the remaining solid alkali extract to neutralize the solid alkali extract.

The solid alkali extract may be washed with water, and then neutralized.

The neutralization may be performed by adding an acid to the solid alkali extract so that the solid alkali extract can be neutralized to pH 7. The acid may include one or more selected from the group consisting of acetic acid, L-glutamic acid, lactic acid, hydrochloric acid, malic acid, succinic acid, citric acid, ethylenediamine-N,N,N',N'-tetraacetic acid (EDTA: edetic acid), $EDTA_2Na$, $EDTA_3Na$, and $EDTA_4Na$. Preferably, the acid may be acetic acid. Also, the acid may be an aqueous solution of 0.1 to 1 M acid in consideration of the efficient neutralization of the solid alkali extract.

In the step (a4), the extract neutralized in the step (a3) may be subjected to solid-liquid separation to remove an extract solution, and the solid extract may be then washed. In this case, the removed solution may be an acid solution used during the neutralization, and may be washed with water.

In the step (a5), the solid extract obtained after the step (a4) may be dried and pulverized to prepare processed green tea.

The processed green tea may be green tea from which catechin, water-soluble substances and proteins may be sequentially removed by means of the step (a) including the steps (a1) to (a5) so that a content of the dietary fibers can be adjusted to 60% by weight or more, and may be in the form of powder. Preferably, the dietary fibers may be insoluble dietary fibers. Particularly, in the step (a2), a content of the insoluble dietary fibers may be adjusted.

In the present invention, the step (b) includes mixing the processed green tea prepared in the step (a), which has a dietary fiber content of 70% by weight or more; an oligosaccharide; and a sugar alcohol and subjecting the resulting mixture to extrusion molding to prepare a granular composition, and specifically includes a process further divided into the following steps (b1) to (b3):

(b1) pulverizing the processed green tea, the oligosaccharide and the sugar alcohol to form a powder raw material having a size of 80 meshes or less;

(b2) adding a binding solution to the powder raw material so that the binding solution is mixed with the powder raw material; and (b3) subjecting the mixture obtained in the step (b2) to extrusion molding to form granules.

In the step (b1), the processed green tea, the oligosaccharide and the sugar alcohol may be pulverized to form a powder raw material having a size of 80 meshes or less.

The weights and types of the processed green tea, the oligosaccharide and the sugar alcohol are as described above.

The size of the powder raw material may be less than or equal to 80 meshes, preferably 75 meshes, and more preferably 70 meshes, and may be greater than at least 0 meshes. When the size of the powder raw material is out of this size range, a mixing process (b2) and an extrusion molding process (b3) as will be described below may not be performed smoothly.

In this case, the processed green tea, the oligosaccharide and the sugar alcohol may be pulverized together with the additives as described above, for example, according to the present invention, one or more selected from the group consisting of a natural carbohydrate, a sweetening agent, nutrients, vitamins, a mineral (an electrolyte), a flavoring agent (a synthetic flavoring agent, a natural flavoring agent, and the like), a coloring agent, a filler (cheese, chocolate, and the like), pectic acid and salts thereof, alginic acid and salts thereof, organic acid, a protective colloidal thickening agent, a pH control agent, a stabilizing agent, a preservative, an antioxidant, glycerin, an alcohol, a carbonizing agent, and a flesh in order to form a powder raw material.

In the step (b2), a binding solution may be added to the powder raw material so that the binding solution can be mixed with the powder raw material.

The binding solution may include one or more selected from the group consisting of purified water, spirits, and hydrocolloids. In this case, the binding solution may be added at a content of 0.5 to 100 parts by weight, preferably 50 to 70 parts by weight, based on 100 parts by weight of the powder raw material, so that the binding solution can be mixed with the powder raw material. When the content of the binding solution is less than or greater than this content range, a mixture having a level of viscosity to perform an extrusion molding process may not be prepared.

Also, the mixing time may be in a range of 10 to 60 minutes, preferably 10 to 45 minutes, and more preferably 10 to 30 minutes. When the mixing time is less than this range, a uniform mixture may not be formed. On the other hand, when the mixing time is greater than this range, there is no benefit arising from an increase in the mixing time.

In the step (b3), the mixture obtained in the step (b2) may be subjected to extrusion molding to form granules.

The size of the granules formed after the extrusion molding is the same as the size of the granular composition, as described above.

Additionally, the granular composition may be dried and sized. In this case, the drying time may be in a range of 20 to 60 minutes to dry the granular composition to the extent suitable for its distribution, storage, digestion, and absorption.

Hereinafter, specific embodiments of the present invention are provided to aid in understanding the present invention. However, it should be appreciated by those skilled in the art that the detailed description disclosed herein is given by way of illustration of the present invention only, and thus various changes and modification may be made without departing from the sprite and scope of the present invention. Also, it will be apparent that such changes and modifications fall within the appended claims.

EXAMPLE 1

Based on the compositions as listed in the Table 1 below, a granular composition was prepared using the following method.

(a) Preparation of Processed Green Tea 100 g of green tea leaves was primarily extracted with 1,500 g of 70% spirits at 70° C. for an hour, and then secondarily extracted with 1,500 g of purified water at 90° C. for 3 hours.

70 g of the green tea residue remaining after the primary and secondary extraction was immersed and extracted in 490 g of an aqueous 0.2 M sodium hydroxide solution at 90° C. for 2 hours to obtain an alkali extract.

The alkali extract was subjected to solid-liquid separation to remove an alkali extract solution, and the remaining solid alkali extract was then washed with drinking water to remove the residual alkali. 210 g of an aqueous 0.2 M acetic acid solution was added to 30 g of the solid alkali extract to neutralize the solid alkali extract.

The neutralized extract was subjected to solid-liquid separation to remove an extract solution, and the remaining solid extract was then washed with drinking water to remove the residua acid.

Next, the solid extract was dried and pulverized to prepare processed green tea.

(b) Preparation of Granules

The processed green tea, an oligosaccharide and a sugar alcohol were mixed, and the resulting mixture was pulverized to prepare a powder raw material having a size of 70 meshes.

Purified water serving as a binding solution was added to the powder raw material, and mixed for 20 minutes using a high-shear mixer (NARA) to prepare a mixture. Specifically, the mixture was prepared by adding 4 parts by weight of the purified water to 100 parts by weight of the powder raw material.

The mixture was put into an extrusion molding machine (Dalton) to prepare a molded product having a granular shape with a size of 1 mm.

The molded product having a granular shape was dried at room temperature for 30 minutes, and put into a sizing machine (SEOWON ENG Inc.) so as to uniformly size the molded product to the granule size, thereby preparing a granular composition.

TABLE 1

|  | Processed green tea (% by weight) |  | Oligosaccharide (% by weight) |  | Sugar alcohol (% by weight) |  |
|---|---|---|---|---|---|---|
| Example 1 | Insoluble dietary fiber content: 95% by weight | 45 | Fructooligosaccharide | 15 | Xylitol | 40 |
| Example 2 | Insoluble dietary fiber content: 95% by weight | 45 | Fructooligosaccharide | 15 | Erythritol | 40 |
| Example 3 | Insoluble dietary fiber content: 95% by weight | 45 | Fructooligosaccharide | 15 | Xylitol Erythritol | 20 20 |
| Comparative Example 1 | Insoluble dietary fiber content: 95% by weight | 60 | Fructooligosaccharide | 40 | — | — |
| Comparative Example 2 | Insoluble dietary fiber content: 95% by weight | 60 | — | — | Xylitol | 40 |

EXAMPLE 2

A granular composition was prepared in the same manner as in Example 1, except that erythritol was used as the sugar alcohol instead of the xylitol.

EXAMPLE 3

A granular composition was prepared in the same manner as in Example 1, except that xylitol and erythritol were used together as the sugar alcohol instead of the xylitol.

Comparative Example 1

A granular composition was prepared in the same manner as in Example 1, except that the sugar alcohol was not used.

Comparative Example 2

A granular composition was prepared in the same manner as in Example 1, except that the oligosaccharide was not used.

Experimental Example 1

Formation of granules was determined for Examples and Comparative Examples. When the granules were formed, the contents of the dietary fibers included in the granular composition were measured, as follows. The results are listed in Table 3 below.

(1) Formulation of Granules

The products prepared in Examples and Comparative Examples were observed with the naked eye to determine whether or not the granules were formed.

(2) Measurement of Dietary Fiber Content

Two dry samples were prepared, and then sequentially digested with heat-resistant α-amylase, protease, amyloglucosidase enzymes to remove starch and proteins. In this case, a food containing 10% or more of fats was tested after the fats were removed before drying.

Total dietary fibers (TDFs) were quantified by treating dietary fibers dissolved in an enzymatic degradation product with ethanol to precipitate the dietary fibers, filtering the dietary fibers, washing the dietary fibers with ethanol and acetone, and drying the dietary fibers to weigh the dietary fibers.

Insoluble dietary fibers (IDFs) were quantified by filtering an enzymatic degradation product, washing the residue with warm water, and weighing the residue.

Water-soluble dietary fibers (SDFs) were quantified by combining a filtrate and a wash solution obtained during pretreatment of IDFs, precipitating the resulting mixture with ethanol, and filtering, drying and weighing the mixture. Amounts of the proteins and batches were calibrated with respect to the weight of the residue by calculating the contents of the total dietary fibers and the insoluble and water-soluble dietary fibers.

(3) Flowability

An angle of a conical pile formed when a granular powder falls in a vertical direction is referred to as an angle of repose. The flowability of the granular powder may be determined based on the angle of repose. The measurement was made using an angle-of-repose measuring machine. A funnel for testing an angle of repose was installed so that the end of the funnel is positioned at a height of 7.5 cm from the bottom of a round base plate, and a shutter of the tester funnel was then closed. 100 g of a test sample was put into a tester funnel for testing an angle of repose, and the shutter was opened to allow powder to flow out of the tester funnel. When a conical pile was formed on the round base plate, a height of the conical pile was measured using a height gauge. The angle of repose was measured using Equation 1 below.

$$\mathrm{Tan}(\text{Angle of Repose}:\theta°) = h/r$$

$$\text{Angle of Repose}(\theta°) = \mathrm{actan}(h/r) \qquad \text{<Equation 1>}$$

h: Height of stacked powder r: Radius of a base plate

The criteria for evaluation of flowability according to the measured angle of repose are as listed in Table 2 below.

TABLE 2

| Angle of repose (θ°) | Flow ability |
|---|---|
| 25 to 30 | Very good |
| 31 to 35 | Good |
| 36 to 40 | Mean |
| 41 to 45 | Little bad |
| 46 to 55 | Bad |
| 56 to 65 | Very bad |
| 66 or more | Very very bad |

TABLE 3

| | Granules formed or not formed | Dietary fiber content in granular composition (% by weight) | oligosaccharide content (% by weight) | Flowability |
|---|---|---|---|---|
| Example 1 | Formed | 57 | 15 | Good |
| Example 2 | Formed | 57 | 15 | Good |
| Example 3 | Formed | 57 | 15 | Good |
| Comparative Example 1 | Not formed | 18 | 40 | Very very bad |
| Comparative Example 2 | Formed | 57 | 0 | Good |

Referring to Table 3, it was confirmed that the granules containing dietary fibers and an oligosaccharide were not prepared when the granular composition did not contain a sugar alcohol. When the granules were formed, the flowability was improved compared to the composition which did not form the granules, which makes it possible to expect an effect of improving the convenience for eating and easy packaging.

The granular composition according to the present invention has little scattered dust due to the good flowability, is not stuck to teeth during the food intake, has an improved choking phenomenon, and is favorable for manufacturing goods due to the good filling properties.

Also, the oligosaccharide included in the granular composition can become food for the lactobacilli, thereby further enhancing an effect of preventing or ameliorating large intestine-related diseases.

In addition, the processed green tea included in the granular composition can be used to form granules without lumping using a suitable amount of a sugar alcohol.

Further, the processed green tea can be prepared by means of an extraction process using green tea as the raw material, particularly prepared so that the content of the insoluble dietary fibers is greater than or equal to 70% by weight, thereby suggesting a new plan to make use of green tea and a new technique for processing green tea.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A granular composition comprising processed green tea having a dietary fiber content of 70% by weight or more; an oligosaccharide; and a sugar alcohol,
wherein the granular composition comprises 30 to 60% by weight of the processed green tea; 5 to 30% by weight of the oligosaccharide; and 30 to 50% by weight of the sugar alcohol.

2. The granular composition of claim 1, wherein the content of dietary fibers included in the processed green tea is greater than or equal to 90% by weight.

3. A granular composition comprising processed green tea having a dietary fiber content of 70% by weight or more; an oligosaccharide; and a sugar alcohol,
wherein the oligosaccharide comprises one or more selected from the group consisting of fructooligosaccharides, maltooligosaccharides, isomaltooligosaccharides, galactooligosaccharides, and soy oligosaccharides.

4. The granular composition of claim 1, wherein the sugar alcohol comprises one or more selected from the group consisting of xylitol, erythritol, isomalt, maltitol, sorbitol, mannitol, lactitol, and manatol.

5. The granular composition of claim 1, wherein the granular composition has a particle size of 0.5 to 2 mm.

6. A method for preparing a granular composition, the method comprising:
(a) sequentially extracting green tea with spirits and purified water to prepare processed green tea having a dietary fiber content of 70% by weight or more; and
(b) mixing the processed green tea, an oligosaccharide and a sugar alcohol and then extrusion-molding the resulting mixture,
wherein the granular composition comprises processed green tea having a dietary fiber content of 70% by weight or more; an oligosaccharide; and a sugar alcohol, and
wherein the granular composition comprises 30 to 60% by weight of the processed green tea; 5 to 30% by weight of the oligosaccharide; and 30 to 50% by weight of the sugar alcohol.

7. The method of claim 6, wherein the step (a) comprises the following steps (a1) to (a5):
(a1) primarily extracting the green tea with spirits and secondarily extracting the green tea with purified water;
(a2) extracting the green tea residue remaining after the primary and secondary extraction in the step (a1) with an alkali;
(a3) subjecting the alkali extract obtained in the step (a2) to solid-liquid separation to remove an alkali extract solution and adding an acid to the remaining solid alkali extract to neutralize the solid alkali extract; and
(a4) subjecting the acid extract neutralized in the step (a3) to solid-liquid separation to remove an acid extract solution and washing the remaining solid acid extract; and
(a5) drying and pulverizing the solid extract obtained after the step (a4) to prepare processed green tea.

8. The method of claim 6, wherein the step (b) comprises the following steps (b1) to (b3):
(b1) pulverizing the processed green tea, the oligosaccharide and the sugar alcohol to form a powder raw material having a size of 80 meshes or less;
(b2) adding a binding solution to the powder raw material so that the binding solution is mixed with the powder raw material; and
(b3) subjecting the mixture obtained in the step (b2) to extrusion molding to form granules.

9. The method of claim 8, wherein the binding solution comprises one or more selected from the group consisting of purified water, spirits, and hydrocolloids.

10. The granular composition of claim 3, wherein the granular composition comprises 30 to 60% by weight of the processed green tea; 5 to 30% by weight of the oligosaccharide; and 30 to 50% by weight of the sugar alcohol.

11. The granular composition of claim 3, wherein the content of dietary fibers included in the processed green tea is greater than or equal to 90% by weight.

12. The granular composition of claim 3, wherein the sugar alcohol comprises one or more selected from the group consisting of xylitol, erythritol, isomalt, maltitol, sorbitol, mannitol, lactitol, and manatol.

13. The granular composition of claim 3, wherein the granular composition has a particle size of 0.5 to 2 mm.

* * * * *